ง! 4,657,338

United States Patent [19]
Khoe et al.

[11] Patent Number: 4,657,338
[45] Date of Patent: Apr. 14, 1987

[54] CONNECTOR FOR A PLURALITY OF OPTICAL WAVEGUIDES

[75] Inventors: Giok D. Khoe, Eindhoven, Netherlands; Dieter Rittich, Overath; Bernhard Schmidt, Neunkirchen, both of Fed. Rep. of Germany; Johannes H. F. M. van Leest, Eindhoven, Netherlands

[73] Assignee: U.S. Philips Corporation, New York, N.Y.

[21] Appl. No.: 731,613

[22] Filed: May 7, 1985

Related U.S. Application Data

[63] Continuation of Ser. No. 474,623, Mar. 11, 1983, abandoned.

[30] Foreign Application Priority Data

Mar. 11, 1982 [DE] Fed. Rep. of Germany ....... 3208797

[51] Int. Cl.$^4$ ................................................. G02B 6/38
[52] U.S. Cl. .............................. 350/96.210; 350/96.20
[58] Field of Search ................. 350/96.20, 96.21, 96.22

[56] References Cited

U.S. PATENT DOCUMENTS

| 3,885,859 | 5/1975 | Dalgleish et al. | 350/96.21 |
|---|---|---|---|
| 4,116,532 | 9/1978 | Hubbard et al. | 350/96.21 |
| 4,217,031 | 8/1980 | Mignien et al. | 350/96.21 |
| 4,281,892 | 8/1981 | Sitabkhan | 350/96.21 |
| 4,368,949 | 1/1983 | Schmidt | 350/96.21 |
| 4,407,562 | 10/1983 | Young | 350/96.20 |
| 4,422,717 | 12/1983 | Schmidt | 350/96.21 |
| 4,429,949 | 2/1984 | Cartier | 350/96.21 |

FOREIGN PATENT DOCUMENTS

| 32340 | 3/1977 | Japan | 350/96.21 |
|---|---|---|---|
| 20344 | 2/1978 | Japan | 350/96.21 |

OTHER PUBLICATIONS

Rittich et al., Conference: Proceedings of the 30th International Wire and Cable Symposium, Cherry Hill, N.J., U.S.A., Nov. 17-19, 1981, "Channel Centered Optical Fiber Connector Without Clearance", pp. 352-361.

Lampe, Conference: Second International Conference on Telecommunication Transmission-Into the Digital Era, London, England, Mar. 17-20, 1981, "Optical Transmission System For A 140 MBIT/S Subscriber Loop", pp. 213-216.

Primary Examiner—William L. Sikes
Assistant Examiner—Frank González
Attorney, Agent, or Firm—Marc D. Schechter

[57] ABSTRACT

A connector for light waveguides comprising a housing and at least one clamping member provided in the housing. The clamping member comprises a base having a V-shaped guide groove extending in the longitudinal direction of the housing. The guide groove receives a light waveguide plug. A pressure element is provided opposite the guide groove. The pressure element consists of a clamping bridge and pressure members acting thereon. The height of the pressure members is smaller than the distance between the engaging surface of the clamping bridge and the wall of the housing extending opposite the engaging surface. Screw caps are provided to be screwed laterally on the housing and to act on the pressure members via a pressure piece. The pressure members consists of individual balls which have the same diameter and which are provided in at least one row, one behind the other, in the direction of the longitudinal axis of the housing. The balls are provided within a longitudinal groove of the clamping bridge and/or the wall of the housing.

3 Claims, 3 Drawing Figures

CONNECTOR FOR A PLURALITY OF OPTICAL WAVEGUIDES

This is a continuation of application Ser. No. 474,623, filed Mar. 11, 1983, now abandoned.

BACKGROUND OF THE INVENTION

The present invention relates to a connector for light waveguides the connector comprises a housing and at least one clamping member arranged in the housing. The clamping member comprises a base having a V-shaped guide groove extending in the longitudinal direction of the housing. The groove receives a light waveguide plug. The clamping member also includes a pressure element arranged opposite the guide groove. The pressure element consists of a clamping bridge and pressure members acting thereon. The heights of the pressure members are smaller than the distance between the engaging surface of the clamping bridge and the wall of the housing extending opposite the engaging surface. Screw caps are provided which can be screwed laterally on the housing and act on the pressure members via a pressure piece.

Such a connector is described in U.S. Pat. No. 4,422,717. In this connector, the pressure members consist of rollers which are provided transverse to the longitudinal axis of the housing. The use of such rollers, however, may lead to nonuniform clamping because the rollers can tilt and twist. Furthermore, it is necessary to manufacture the rollers with high precision since they must be uniform. Such a precision manufacture, however, is comparatively cumbersome and expensive.

Furthermore, it is known from German patent application P No. 3,025,384, to exert pressure on a pressure bridge to fix a light waveguide plug means of spherical pressure members. In this case, however, the clamping force is eccentric so that a clamping moment is produced. This construction has the disadvantage that the light waveguide plug may be engaged in the clamping member in a number of orientations. As a result, errors in alignment and hence transmission may occur.

SUMMARY OF THE INVENTION

It is an object of the invention to improve the known connectors and to provide a light waveguide connector, in particular for monomode fibers, which has a simple construction and which accurately connects two light waveguides with minimal coupling losses.

According to the invention this is achieved in that the pressure members consist of individual balls of the same diameter. The balls are provided in at least one row, one behind the other, in the direction of the longitudinal axis of the housing within a longitudinal groove in the clamping bridge and/or the wall of the housing.

As a result of this construction according to the invention, a sufficient and uniform clamping action is achieved although the force transmitted by the balls on the clamping bridge are transmitted only by paint contact. The V-shaped groove ensures an exact and unambiguous alignment of the plug parts of the light waveguides to be connected.

That a sufficient and uniform clamping force is achieved, in spite of the force transmission by a point only is based on the discovery that inside the clamping bridge the force distribution is uniform so that the plug pin is clamped uniformly.

DESCRIPTION OF THE PREFERRED EMBODIMENTS

Figure 1:
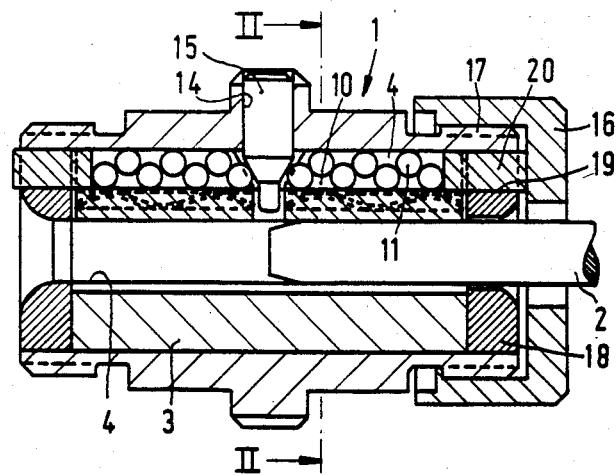
FIG. 1 is a longitudinal sectional view through a connector according to the invention.

As shown in FIG. 1, a connector according to the invention consists of a housing 1, which in the embodiment shown has a cylindrical construction. The housing 1 is open at each end so that plugs 2 of light waveguides (not shown) can be inserted through the two apertures.

Inside the housing 1 is a clamping member. The clamping member comprises a base 3 whose outer circumference matches the inner circumference of the housing in such manner as to be free from play.

The base 3 has a V-shaped guide groove 4 extending in the longitudinal direction of the housing 1. Groove 4 is open on its upper side. The V-shaped guide groove 4 serves to receive and guide and align the plugs 2. The V-groove 4 is arranged below a guide section 5 (FIG. 2) whose side walls 6 extend parallel to the angle bisector 7 of the V-groove 4.

Above the V-groove 4 is a clamping bridge 8. The embodiment shown, clamping bridge 8 is guided in the guide section 5 by an extension 9. The outer contour of the clamping bridge 8 matches to the cylindrical shape of the housing 1 and extends to the base 3 so that, base 3 and clamping bridge 8, when assembled collectively form a member which has a circular cross-section.

A longitudinal groove 10 is formed in the clamping bridge 8 throughout the length of the clamping bridge 8. Balls 11 are arranged one behind the other in groove 10. The diameters of the balls 11 are smaller than the height of the longitudinal groove from the bottom of the groove up to the inner wall of the housing.

In the example shown, seven balls 11 are arranged one behind the other in each groove 10. All of the balls 11 have the same diameter.

The housing 1 further comprises, in its center, an aperture 14. Aperture 14 extends at right angles to the longitudinal axis of the housing 1. A lock pin 15 can be inserted through aperture 14. The upper part of the clamping member is divided by the lock pin 15 into two independent portions, so that a clamping bridge 8 and its associated balls 11 are independently actuable on each side of the lock pin 15. As a result, plugs inserted through the two lateral apertures of the housing 1 can be independently clamped.

Each lateral aperture in the housing 1 is closed by a screw cap 16. Cap 16 is screwed on an external screw thread 17 of the housing 1.

Between the screw cap 16 and the clamping member inside the housing 1 a compensator 18 is provided inside the housing. Compensator 18 has a central aperture for the plug 2. The aperture is flared toward its front. The compensator 18 also has a groove 19 (which is a continuation of groove 10) through which a pressure member 20 is inserted.

The pressure member 20, projects from the groove 19 out of the housing 1 when the cap is unscrewed. When the screw cap 16 is tightened, the pressure member 20 is moved into pushing the longitudinal groove 10 of the clamping bridge 8, pushing the balls 11 together and divided the balls into two planes lying one above the other. As soon as the balls can no longer move in the longitudinal direction and in the direction at right angles thereto, the tightening force of the screw cap is transmitted by the balls to the clamping bridge 8. As a result, the clamping bridge 8 is forced against the plug 2, and plug 2 is thereby clamped in the V-shaped guide groove 4.

The number of balls 11 and the lengths of the V-groove 4 and the pressure member 20 are proportioned so that when the cap 16 is fully tightened, as shown in FIG. 1, the plug 2 is fully clamped in the housing 1.

Figure 2:
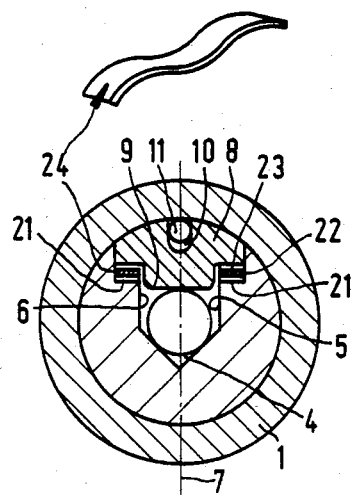
FIG. 2 is a sectional view taken on the line II—II of FIG. 1.

As shown in FIG. 2, the guide shaft 5 has graded steps 21. As a result, the guide shaft widens symmetrically to the angle bisector 7. The clamping bridge 8 also widens correspondingly. Between the opposite faces 22 and 23 of the base 3 and of the clamping member 8, respectively, a spring 24 is provided. Spring 24 is shown as a leaf spring. However, other resilient means may also be used. This spring 24 lifts the clamping bridge 8 from the base 3 when cap 16 is unscrewed so that the plug 2 can be easily pulled out.

As will be apparent from FIG. 2, the bottom of the longitudinal groove 10 advantageously has a circular cross-section to match the shape of the balls 11. As a result, the balls linearly engage the bottom of the groove so that force transmission is improved.

The balls 11 advantageously consist of steel. All parts of the connector according to the invention are manufactured with very low manufacturing tolerances.

Figure 3:
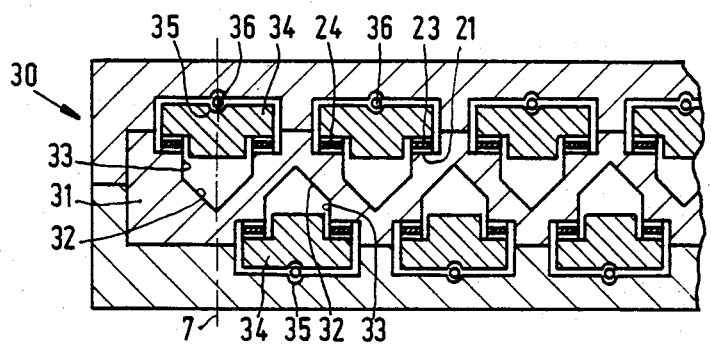
FIG. 3 is a sectional view through a multiple connector according to the invention.

FIG. 3 shows a multiple connector according to the invention. This connector consists of a housing 30 which, in the embodiment shown, advantageously has two parts. The base 31 is inserted centrally in the housing. V-grooves 32 with their guide sections 33 are provided beside each other in the base 31. In this manner a common base part 31 for all individual connectors is available.

Above the V-grooves with their guide sections, clamping bridges 34 are provided clamping bridges 34 are the same as these shown in FIGS. 1 and 2. The clamping bridges 34 again have longitudinal grooves 35 in which the balls 36 are provided, one behind the other.

In contrast with the embodiment shown in FIG. 1, the longitudinal grooves 35 extend not only in the clamping bridges 8, but also in the housing 30. The engaging surfaces of the longitudinal grooves, in both bridges 8 and housing 30, have circular cross-sections. Such a construction could also be chosen for the FIG. 1 embodiment.

In the multiple connector shown in FIG. 3, it is also advantageous to journal the clamping bridges so as to the resilient with respect to the component.

What is claimed is:

1. A light-waveguide connector comprising:
   a housing having a longitudinal axis;
   a base in the housing, said base having a V-shaped guide groove therein extending in the longitudinal direction, said groove for receiving a light-waveguide plug;
   a clamping bridge arranged in the housing opposite the guide groove, said clamping bridge having a first side facing the guide groove and a second side opposite the first side, the second side of the clamping bridge and the housing defining a longitudinal groove having a height;
   a row of balls of uniform diameter arranged between the second side of the clamping bridge and the housing in the longitudinal groove, the diameters of the balls being less than the height of the longitudinal groove;
   a pressure member arranged between the second side of the clamping bridge and the housing in the longitudinal groove, said pressure member adapted to slide in the longitudinal direction and to bear on the balls; and
   a screw cap arranged to be screwed on the housing around the longitudinal axis, said screw cap bearing on the pressure member and sliding it in the longitudinal direction;
   characterized in that:
   the V-shaped guide groove has an angle bisector which extends through the centers of the balls;
   the base has a guide section above the guide groove, the guide section having sidewalls which extend parallel to the bisector of the groove;
   the base has two steps, one on each side of the bisector of the guide groove;
   the connector further comprises resilient means arranged on each step between the clamping bridge and the base to urge the clamping bridge and the base away from each other;
   the housing comprises a plurality of clamping assemblies, each clamping assembly comprising a base, a clamping bridge, a row of balls, a pressure member, and a screw cap; and
   the bases of all of the clamping assemblies are formed of a single common base, the V-shaped guide grooves in the common base being parallel to one another, adjacent V-shaped guide grooves being rotated 180° with respect to each other.

2. A connector as claimed in claim 1, characterized in that the longitudinal grooves extend in both the base and the housing.

3. A connector as claimed in claim 2, characterized in that the longitudinal grooves have widths substantially equal to the diameters of the balls.

* * * * *